(12) United States Patent
Schierling et al.

(10) Patent No.: US 11,271,395 B2
(45) Date of Patent: Mar. 8, 2022

(54) METHOD FOR OPERATING A DIRECT-CURRENT GRID AND DIRECT-CURRENT GRID

(71) Applicant: SIEMENS AKTIENGESELLSCHAFT, Munich (DE)

(72) Inventors: Hubert Schierling, Erlangen (DE); Benno Weis, Hemhofen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 326 days.

(21) Appl. No.: 16/495,944

(22) PCT Filed: Feb. 19, 2018

(86) PCT No.: PCT/EP2018/054035
§ 371 (c)(1),
(2) Date: Sep. 20, 2019

(87) PCT Pub. No.: WO2018/172000
PCT Pub. Date: Sep. 27, 2018

(65) Prior Publication Data
US 2020/0144815 A1    May 7, 2020

(30) Foreign Application Priority Data
Mar. 23, 2017  (EP) ..................................... 17162600

(51) Int. Cl.
*H02J 1/10*    (2006.01)
*H02J 3/38*    (2006.01)
(Continued)

(52) U.S. Cl.
CPC ................ *H02J 1/08* (2013.01); *H02J 1/082* (2020.01); *H02J 1/10* (2013.01); *H02J 1/14* (2013.01)

(58) Field of Classification Search
CPC ...... H02J 1/14; H02J 1/00; H02J 1/082; H02J 1/10
See application file for complete search history.

(56) References Cited

U.S. PATENT DOCUMENTS

| 7,489,048 B2 | 2/2009 | King et al. |
| 2003/0098619 A1 | 5/2003 | Takahashi |

(Continued)

FOREIGN PATENT DOCUMENTS

| WO | WO 2012038101 A1 | 3/2012 |
| WO | 2757647 | 7/2014 |

OTHER PUBLICATIONS

PCT International Search Report and Written Opinion of International Searching Authority dated Jun. 13, 2019 corresponding to PCT International Application No. PCT/EP2019/054035 filed Feb. 19, 2018.

*Primary Examiner* — Hal Kaplan
*Assistant Examiner* — Rasem Mourad
(74) *Attorney, Agent, or Firm* — Henry M. Feiereisen LLC (57) ABSTRACT

A direct-current network has an infeed unit, a plurality of network sections which are each separably inter connected by respective switching elements, and a controllable current-limiting unit, which limits charge-transfer currents that flow between the network sections because of different voltages of the network sections following disconnection of the network sections from the infeed unit and before reconnection of the network sections to the infeed unit.

16 Claims, 3 Drawing Sheets

(51) Int. Cl.
*H02J 7/34* (2006.01)
*H02J 1/08* (2006.01)
*H02J 1/14* (2006.01)

(56) References Cited

U.S. PATENT DOCUMENTS

2013/0187451 A1\* 7/2013 Boe .......................... H02J 1/14
　　　　　　　　　　　　　　　　　　　　307/11
2014/0028094 A1　　 1/2014 Rozman et al.
2014/0203639 A1\* 7/2014 Rozman ................... H02J 1/14
　　　　　　　　　　　　　　　　　　　　307/28

\* cited by examiner

METHOD FOR OPERATING A DIRECT-CURRENT GRID AND DIRECT-CURRENT GRID

CROSS-REFERENCES TO RELATED APPLICATIONS

This application is the U.S. National Stage of International Application No. PCT/EP2018/054035, filed Feb. 19, 2018, which designated the United States and has been published as International Publication No, WO 2018/172000 A1 and which claims the priority of European Patent Application, Serial No. 17162600.5, filed Mar. 23, 2017, pursuant to 35 U.S.C. 119(a)-(d).

BACKGROUND OF THE INVENTION

The invention relates to a method for operating a direct-current network. The invention furthermore relates to a direct-current network.

Distributing energy, for example within an industrial plant, by means of direct current (DC) is advantageous not only due to the simplicity of exchanging energy between items of equipment and/or the simplicity of making a connection to (renewable) energy sources. The simple and highly modular nature of a DC network has also proved to be advantageous precisely in the constant flux of today's industry.

Direct-current networks, hereinafter also denoted DC networks, typically have a plurality of network sections, for example energy sources, energy stores and electrical consumers. The network sections are frequently electrically disconnectably connected together via switching and protective elements. The switching and protective device conventionally has electronic and/or galvanic switches for disconnecting the network sections.

A DC network conventionally also has a connection to a three-phase network which provides the supply for the DC network. The three-phase current is here frequently rectified with the assistance of a rectifier and supplied to the DC network via an infeed unit.

In the event of an intentional and/or unintentional shutdown of the DC network and for example disconnection of the DC network from the three-phase network, the energy stores of the DC network conventionally have differing voltages due to their differing levels of electrical charge. Interconnecting the network sections to one another and/or to the three-phase network is undesirable in the charged state of the energy stores due to the uncontrolled flow of charge-reversal currents caused by the interconnection and is as far as possible to be avoided since the charge-reversal currents frequently result in irreversible damage within the DC network.

A charge-reversal current may be limited in controlled manner by draining the charge-reversal currents in controlled manner by means of a bypass circuit. As its name would suggest, the bypass circuit is to this end arranged within the switching and protective element of each network section in such a manner that it bypasses the switch. The switching and protective device thus has a further current path, namely the bypass circuit, which extends in parallel to the switches. The bypass circuit typically has a current-limiting component, for example an ohmic resistor, and a bypass switch, for example a galvanic switch. Due to the preferred provision of current limitation by means of an ohmic resistor, this variant is also known as resistive current limitation.

Closing the bypass circuit when the switching and protective device is open results in charge-reversal currents flowing through the bypass circuit. Thanks to the current-limiting component, the value of the charge-reversal currents is limited.

Current limitation by means of the bypass circuit is, however, on the one hand lossy due to the ohmic resistor and on the other hand costly in terms of labor and materials since each network section must have its own bypass circuit which is appropriately dimensioned for the respective network section.

Against this background, the object of the invention is to provide a method for operating a direct-current network with the assistance of which any charge reversal currents which arise can be limited inexpensively and in a manner involving low losses.

SUMMARY OF THE INVENTION

The object is achieved according to the invention by a method for operating a direct-current network (DC network) which has a plurality of network sections disconnectably connected via in each case a switching element and an infeed unit, wherein, after disconnection of the network sections from the infeed unit and prior to interconnection of the network sections with the infeed unit, charge-reversal currents which flow between the network sections or between the infeed unit and the network sections due to differing voltage levels are limited with the assistance of an open-loop controllable current limiter unit.

Advantageous configurations, further developments and variants are the subject matter of the subclaims.

The DC network has a plurality of network sections disconnectably connected via a switching element and an Infeed unit. The infeed unit and the network sections are here likewise disconnectably connected by means of at least one switching element. The switching elements have on the one hand an electronic switch, for example a transistor for switching DC network power and on the other hand a galvanic switch for electrical isolation. The galvanic switch takes the form of a circuit-breaker and serves to isolate the network section connected thereto from the infeed unit, for example in an emergency or to protect workers, for example during maintenance work.

Furthermore, after disconnection of the infeed unit from the network sections and prior to (renewed) interconnection of the infeed unit with the network sections, any charge-reversal currents which arise are limited with the assistance of an open-loop controllable current limiter unit. Contrary to everyday parlance, open-loop controllable is in the present case taken to mean a deliberate variation and/or variability of a level of a charge-reversal current.

Variability of the level of the charge-reversal current is an advantage over current limitation by means of a purely ohmic resistor, since in this latter case the maximum current which can flow is defined by Ohm's law. The open-loop controllable current limiter unit is thus individually adaptable to each DC network.

The charge-reversal currents of the network sections are furthermore preferably limited by means of an open-loop controllable current limiter unit. The rationale underlying this configuration is that, due to the open-loop controllable current limiter unit, said unit can be straightforwardly adapted to possible changes in the charge-reversal currents. Changes in the charge-reversal currents are, for example, taken to mean an increase in the charge-reversal currents for example due to the DC network being extended with further network sections.

Charge-reversal currents conventionally flow on interconnection of energy stores which have a differing state of charge and thus differing voltage levels. Charge-reversal currents are usually uncontrolled, unwanted and often result in damage to and/or destruction of components in the DC network.

Open-loop controllable limitation of the charge-reversal currents means for the components of the DC network that the individual network sections can be interconnected with the infeed unit without danger after a prior disconnection.

The DC network is expediently connected to the infeed unit via an infeed line, such that the DC network is supplied with an infeed voltage via the infeed line of the infeed unit. Similarly and additionally, the current limiter unit has a distribution line via which it is connected to the network sections. The current limiter unit is thus connected to the network sections of the DC network in such a way that it limits possible charge-reversal currents of all of the network sections connected to the DC network via the distribution line.

The current limiter element in this way provides central current limitation in comparison with the resistive current limitation which proceeds individually on each network section. A low level of circuit engineering complexity is furthermore achieved in this way.

According to one advantageous configuration, the current limiter unit in a first variant configuration takes the form of an open-loop controllable voltage supply without electrical isolation, for example in the form of a controllable voltage source. The distribution line additionally has a charging line via which the network sections are precharged after disconnection from the infeed unit and prior to interconnection with same.

For precharging, the open-loop controllable voltage supply feeds a precharging voltage into the network sections via the precharging line and thus equalizes the differing voltages of the energy stores with the precharging voltage. In general, the charge-reversal currents are thus limited independently of the differing voltage levels.

Equalization is, however, not necessarily here taken to mean that, after precharging, the voltages of the network sections exactly correspond to the precharging voltage. Instead, equalization is also achieved when the voltages of the network sections and the precharging voltage have a voltage difference with a value in the range from preferably 10% to 20% of the infeed voltage. According to one particularly preferred configuration, after equalization the network sections have, apart from component-related fluctuations, an exactly identical voltage.

It is preferably also complementarily provided that the precharging voltage is increased during precharging in order to ensure more rapid equalization of the differing voltages of the network sections. The precharging voltage is, for example, increased linearly. Alternatively, the increase proceeds in steps.

The rationale underlying this increase in the precharging voltage is to cause the charge-reversal currents to drain away as quickly as possible. To this end, the network sections are interconnected via the open-loop controllable voltage supply at the start of precharging. This allows the undesired charge-reversal currents to drain away. The precharging voltage fed in by the voltage supply via the precharging line limits the level of the charge-reversal currents such that the latter drain away without damaging and/or destroying the components of the network sections.

Increasing the precharging voltage shortens the time taken for the charge-reversal currents to drain away and the differing voltage levels of the network sections to equalize in comparison with a time which is required, for example, for limiting the charge-reversal currents by means of resistive current limitation. For example, increasing the precharging voltage shortens drainage of the charge-reversal currents by preferably 50% in comparison with the variant of resistive current limitation by means of the bypass circuit (in both variants, the limited current has the same value for the purposes of determining the time difference).

The open-loop controllable voltage supply preferably takes the form of a DC-DC converter, in particular of a voltage reduction unit. The voltage reduction unit has an input side and an output side.

Configuring the voltage supply as a voltage reduction unit has the advantage that simple and loss-free closed-loop control, in particular the increase in precharging voltage, is achieved. Loss-free closed-loop control is based on a resistanceless design of the voltage reduction unit. Contrary to everyday parlance, resistanceless is in the present case taken to mean a design of the voltage reduction unit which in particular has no ohmic resistor in a power path. Power path is here taken to mean a current path and/or a plurality of current paths of an electrotechnical component which transmit(s) the power of the component and/or through the component.

The DC-DC converter, in particular the voltage reduction unit, typically has an input voltage on the input side to supply it. The input voltage is the maximum voltage which the DC-DC converter can adjust/set on the output side.

Alternatively, the open-loop controllable voltage supply takes the form of an isolating chopper. In addition to the components of an ordinary voltage reduction unit and/or instead of a component of a voltage reduction unit, an isolating chopper has for example an isolating component, for example a transformer.

The open-loop controllable voltage supply, in particular the voltage reduction unit, is expediently supplied by the infeed unit. In other words, the voltage reduction unit is connected via a supply line to the infeed unit.

The advantage may be considered to reside in the simplicity of circuit engineering which saves not only materials but also costs.

Alternatively, the open-loop controllable voltage supply is supplied by an external voltage source, for example a battery. External is here taken to mean that the voltage source which supplies the voltage supply is not part of the DC network. It is also likewise conceivable to supply the voltage supply by means of an internal voltage source, for example a signal processing supply. It should be noted in this connection that in the configuration of the open-loop controllable voltage supply without electrical isolation, the voltage source of the alternative supply of the voltage supply is necessarily capable of delivering a voltage with a value which preferably at least corresponds, apart from a tolerance in the range of 10% to 20%, to the value of the infeed voltage of the infeed unit.

According to the alternative formation of the voltage supply as an isolating chopper, for example by means of a transformer, a voltage difference outside the above-stated tolerance can also be compensated with the assistance of a suitable selection of the number of turns of the windings and thus of the transformation ratio of transformer.

In order to minimize the draining charge-reversal currents to the greatest possible extent, the precharging voltage is preferably increased to the value of an infeed voltage of the infeed unit over the precharging time profile. The differing voltage levels of the network sections are thus equalized with the voltage level of the infeed voltage.

In this way, a slight voltage difference between the precharged network sections and the infeed unit is ensured after precharging, such that either any charge-reversal currents which are still flowing no longer have any harmful effect or no charge-reversal currents are any longer flowing.

The network sections are precharged with the infeed voltage of the infeed unit in particular by the voltage reduction unit supplied by the infeed unit. To this end, the voltage reduction unit is firstly supplied with the infeed voltage by the infeed unit. The voltage reduction unit then precharges the network sections with the precharging voltage which it increases to the value of the infeed voltage over the precharging time profile. An optimum switching condition is thus established after precharging. The voltage reduction unit then switches itself off and the network sections are interconnected with the infeed unit. Optimum switching conditions are here taken to mean a state of the DC network in which trouble-free interconnection of the infeed unit with the network sections may take place.

According to one expedient configuration, the precharging voltage is in particular fed into the switching element of each network section. The charging line is therefore preferably arranged on the switching element in such a manner that it is connected between the electronic switch and the galvanic switch. This arrangement of the charging line on the one hand permits disconnection of a network section from the current limiter unit and thus from precharging and on the other hand permits precharging of a network section which is disconnected from the infeed unit.

According to a second variant configuration, after disconnection of the infeed unit from the network sections, the charge-reversal currents are limited by open-loop controlled and/or controllable discharging of the charged energy stores of the network sections.

Discharging of the network sections proceeds mutatis mutandis in a similar manner to precharging according to the first variant configuration. One difference is that, according to the second variant configuration, the differing voltages of the network sections decline via an electrical consumer and thus the charge-reversal currents drain away in controlled manner and the energy of the energy stores of the network sections is converted, for example into heat, within the electrical consumer.

Open-loop controllability is achieved by connecting the electrical consumer, for example in a maximally simple development an ohmic resistor, to the network sections by means of a switch, preferably an electronic switch. With the assistance of the switch, the draining charge-reversal currents are limited such that they can drain away via the electrical consumer without damaging the components of the DC network.

Open-loop controlled drainage of the charge-reversal currents permits optimum adaptation to the DC network, even when the DC network is extended by further network sections.

Discharging furthermore brings about an equalization of the differing voltage levels of the network sections with a defined voltage level, for example zero potential.

In addition, discharging is optionally also followed by precharging of the network sections in order to permit renewed interconnection of the network sections with the infeed unit.

In one expedient configuration, the distribution line has a discharging line in this variant. The network sections are furthermore discharged by means of a central discharging unit. The discharging unit preferably includes the electrical consumer and/or the switch. The discharging line is connected to all the network sections and to this end arranged in parallel to the infeed line. The discharging unit and the discharging line are furthermore preferably electrically connected together.

The advantage is that ail the network sections of the DC network are discharged by means of the discharging line via the central discharging unit. Central is here taken to mean that the DC network has just one discharging unit which is configured to discharge all the network sections of the DC network. This permits discharging of the network sections to be carried out with lithe complexity.

According to a preferred development, the discharging unit takes the form of an open-loop controllable discharging chopper. The discharging chopper has an electronic switch, preferably a transistor, and an electrical consumer, preferably an ohmic resistor.

After disconnection of the network sections from the infeed unit, the charge-reversal currents, thus limited in value, drain away via the open-loop controllable discharging chopper and the differing voltage levels of the network sections are equalized.

The advantage of this configuration may be considered to reside in the simplicity of achieving equalized voltage levels of the network sections and thus an optimum switching condition for (renewed) interconnection of the network sections with the infeed unit. In a similar manner to the above-stated first variant, equalized voltages need not necessarily be taken to mean an exactly identical value of the differing voltages of the network sections, but instead an approximation of the individual voltages of the network sections to one voltage value.

In the first and/or second variant configuration, current limitation is preferably open-loop controlled by means of a remote controller, for example by means of a remote connection. The advantage is that for example a plurality of DC networks can be open-loop controlled from a control center.

The DC network preferably includes both the first variant of charge-reversal current limitation by means of precharging and the second variant of charge-reversal current limitation by means of discharging the network sections. To this end, the distribution line preferably takes the form of a combined line which includes the precharging line and the discharging line.

The object is furthermore achieved according to the invention by a direct-current network (DC network) which has an infeed unit with an infeed line and a plurality of network sections connected so as to be disconnectable via switching elements from the infeed unit, wherein, in addition to the infeed unit, an open-loop controllable current limiter unit is connected to the network sections, wherein the current limiter unit is configured during operation to limit charge-reversal currents which arise due to a voltage difference between the network sections or between the infeed unit and the network sections.

The DC network has an infeed unit with an infeed line and a plurality of network sections. The network sections are disconnectably connected via switching elements to the infeed unit. The switching element preferably has a circuit-breaker, for example a transistor and a galvanic switch for electrical isolation of the network section from the infeed unit.

In order to limit charge-reversal currents which arise due to a voltage difference within the network sections, the electrical supply network has an open-loop controllable current limiter unit. Open-loop controllable is in the present case taken to mean that the current limiter unit is configured in such a way that, in order to limit the charge-reversal currents, the level of limitation of the charge-reversal currents is varied and/or variable by means of the current limiter unit. In other words, a maximum admissible value of the flowing charge-reversal currents is adjusted and/or adjustable by means of the current limiter unit.

In this way, adaptation of the current limiter unit to the DC network is ensured, such that even in the event of changes within the DC network, for example due to an extension of the DC network with further network sections, the current limiter unit is merely adapted with regard to the maximum admissible value of the charge-reversal currents.

The current limiter unit has an additional distribution line and is connected by means of the latter to the network sections.

In order to limit any charge-reversal currents which arise in the network sections of the electrical supply network with the current limiter unit, the distribution line is preferably connected in parallel to the infeed.

According to a first variant embodiment, the charge-reversal currents are preferably limited with the assistance of precharging of the network sections, such that the differing voltages of the network sections are equalized. To this end, the current limiter unit has an open-loop controllable voltage supply and the distribution line has a charging line for precharging the network sections with a precharging voltage. Precharging proceeds during operation of the open-loop controllable voltage supply.

The open-loop controllable voltage supply is here configured such that, during precharging, the precharging voltage has a profile which is increased in value until it is equalized with a value of an infeed voltage of the infeed unit, in particular has an identical value to the infeed voltage. The infeed voltage is here taken to mean a voltage with which the electrical supply network is supplied.

The open-loop controllable voltage supply preferably takes the form of a voltage reduction unit. This configuration has the advantage that low-loss precharging of the network sections is achieved by means of the voltage reduction unit, since the voltage reduction unit is of resistanceless construction. Contrary to everyday parlance, resistanceless is here taken to mean that the voltage reduction unit in particular has no ohmic resistors in a power path. A further advantage may be considered to reside in the simplicity of increasing the precharging voltage by modifying a duty factor of the voltage reduction unit.

An output voltage, in this case the precharging voltage, which corresponds to a multiple of an input voltage of the voltage reduction unit, can be adjusted via the duty factor of the voltage reduction unit. The multiple of the input voltage includes values in a range between 0 and 1 or, in relative terms, values in a range between 0% and 100%, For example, a voltage reduction unit which is adjusted to a duty factor of 0.5 has an output voltage, the value of which is half that of the input voltage.

The voltage supply furthermore preferably has an infeed voltage of the infeed unit as the input voltage. The rationale underlying supplying the voltage reduction unit with the infeed voltage of the infeed unit is that the voltage reduction unit is in this way designed such that, after precharging, the voltages of the network sections are equalized with the infeed voltage of the infeed unit and thus have an optimum switching condition for interconnection of the network sections with the infeed unit.

Alternatively, the voltage reduction unit is supplied by a voltage source, for example a signal processing voltage supply.

According to a second variant embodiment, the current limiter unit has a discharging unit and the distribution line has a discharging line for current-limited discharging of network sections which are disconnected from the infeed unit. Equalization of the differing voltages of the network sections is straightforwardly taken into account by discharging. The rationale underlying this configuration is furthermore that the DC network has just one discharging unit for discharging the energy stores of all of the network sections. In addition, advantages with regard to the installation and operating costs of the electrical supply network are achieved in this way.

In particular, the discharging unit takes the form of an open-loop controllable discharging chopper. This development has the advantage that simple and closed-loop controlled and/or controllable current limitation is achieved with the assistance of the open-loop controllable discharge chopper. The open-loop controllable discharging chopper preferably has a switch, in particular a transistor, for closed-loop control and/or controllability.

According to an alternative configuration, a plurality of current limiter units, for example per switchgear cabinet, which have a cascade structure are connected to the direct current supply. To this end, a current limiter unit of a respectively downstream network section is supplied from a respectively higher level network section. A plurality of network sections are furthermore preferably connected to each current limiter unit.

The charging line and/or the discharging line preferably has a decoupling diode. The decoupling diode is expediently arranged on a terminal of the charging line and/or discharging line on the respective switching element. As in the present case its name would suggest, arranging a decoupling diode has the advantage that the individual network sections are decoupled from one another. Decoupling is in the present case here taken to mean that, during precharging or discharging, the network sections do not influence one another by charge-reversal currents.

The advantages listed with regard to the method and preferred configurations are to be applied mutatis mutandis to the DC network and vice versa.

BRIEF DESCRIPTION OF THE DRAWING

Exemplary embodiments of the invention are described below in greater detail with reference to the figures, which, in sometimes greatly simplified depictions, show.

DETAILED DESCRIPTION OF PREFERRED EMBODIMENTS

Equivalently acting parts are provided with the same reference signs in the figures.

Figure 1:
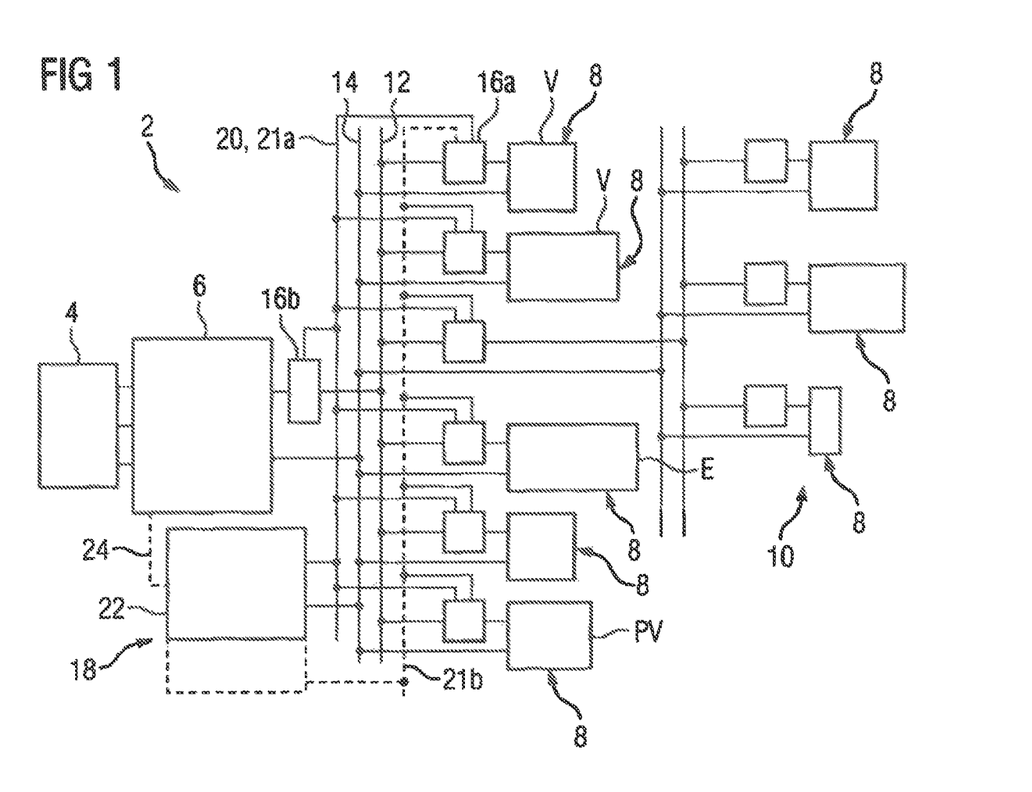
FIG. 1 a circuit diagram of a direct-current network (DC network)

FIG. 1 shows a direct-current network (DC network) 2, in particular for industrial plants, which has a direct-current network 2 (DC network).

The direct-current network 2 additionally has a connection unit 4 for connection to a network, for example a three-phase network. An infeed unit 6, in which typically the three-phase current is rectified into a direct current and then fed into the DC network 2, is connected to the connection unit 4. The DC network 2 has a plurality of network sections 8 connected to the infeed unit 6 and, in the exemplary embodiment, a subnet 10. A subnet 10 in turn has a plurality of network sections 8. Network sections 8 are for example electrical consumers V, energy stores E or photovoltaic systems PV. The network sections 8 are connected to the infeed unit 6 by means of an infeed line 12. The electrical direct current flows via the infeed line 12 into the individual network sections 8. The direct current then flows back to the infeed unit 6 via a ground line 14.

Figure 1A:
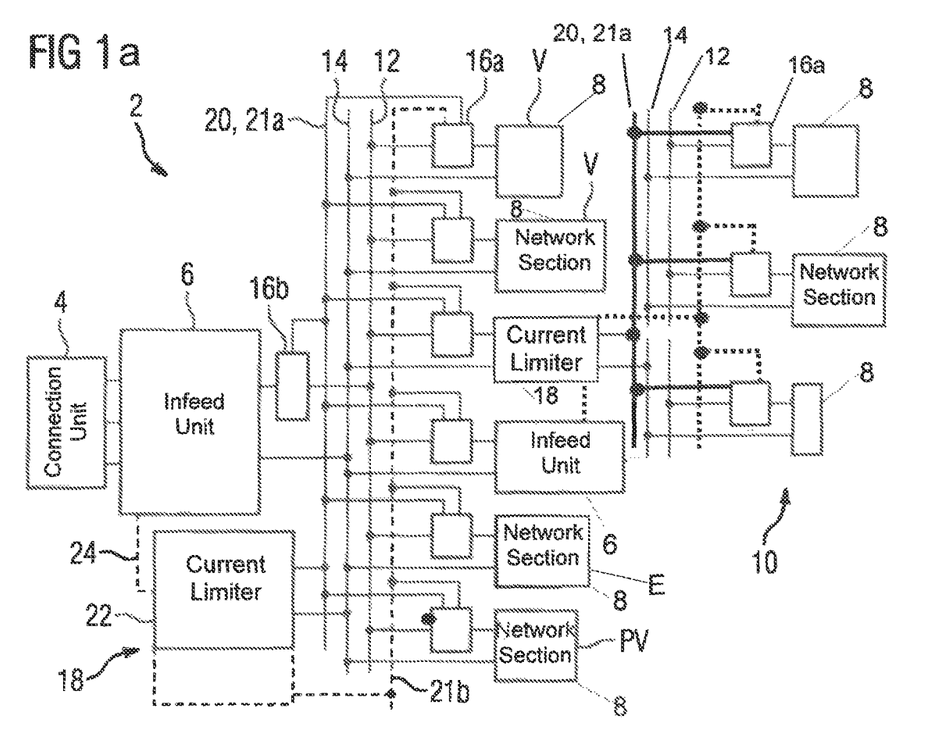
FIG. 1a a circuit diagram of a direct-current network (DC network) with cascade structure.

The subnet 10 may be connected directly to the infeed unit 6. Alternatively, as shown in FIG. 1a, a plurality of current limiter units 18, for example per switchgear cabinet, which have a cascade structure may be connected to the direct current supply. To this end, a current limiter unit 18 of a respectively downstream network section 8 is supplied from a respectively higher-level network section 8.

In order to protect the DC network 2 or the network sections 8 from overvoltages and/or overcurrents, each network section 8 has a switching element 16a. Similarly, a main switching element 16b is connected between the infeed unit 6 and the infeed line 12. The main switching element 16b and the switching elements 16a are of the same technical structure. The main switching element 16b permits disconnection of the entire DC network 2 from the connection unit 4, for example in the case of an emergency shutdown or for maintenance purposes.

The DC network 2 has a current limiter unit 18 which is connected via a distribution line 20 with all the network sections 8 and subnets 10 of the DC network 2. In the exemplary embodiment, the distribution line 20 is connected in parallel to the infeed line 12 and in parallel to the ground line 14.

After disconnection of the network sections 8 from the infeed unit 6, for example via the main switching element 16b, charge-reversal currents arise within the DC network 2 due to differing voltages when the network sections 8 are interconnected again with the infeed unit 6. Charge-reversal currents which are uncontrolled and/or unlimited in value may damage and/or destroy the components of the DC network 2. In order to have the charge-reversal currents drain away in controlled manner, according to a first variant the network sections 8 are expediently firstly interconnected via the current limiter unit 18 prior to renewed interconnection with the infeed unit 6. The charge-reversal currents are in this way subjected to current limitation.

The current limiter unit 18 is configured such that the network sections 8 are precharged with a precharging voltage via the distribution line 20 which according to the first variant has a charging line 21a. The value of the precharging voltage is increased during precharging until it is equalized with a value of an infeed voltage of the infeed unit 6. The infeed voltage is here taken to mean the voltage which is supplied to the DC network 2 by the infeed unit 6. Once the voltages of the network sections have equalized, the network sections 8 are interconnected in trouble-free manner with the infeed unit 6.

In order to adjust and/or open-loop control the precharging voltage, the current limiter unit 18 has a DC-DC converter, in the exemplary embodiment in particular a voltage reduction unit 22 and alternatively an isolating chopper. In the exemplary embodiment, the voltage reduction unit 22 includes supply 24 by the infeed unit 6.

In the exemplary embodiment, the precharging voltage for a respective network section is fed into the associated switching element 16. The advantage of this configuration is disconnection of a network section 8 which is not intended to undergo precharging, since said network section is for example not interconnected again to the infeed unit 6.

Figure 2:
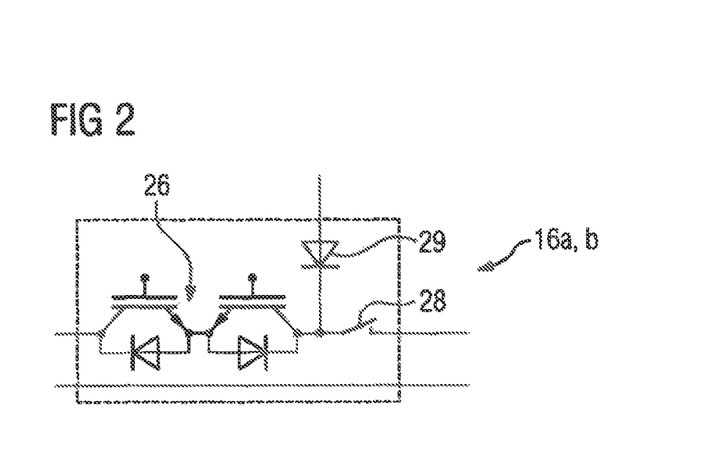
FIG. 2 a switching element with a connected charging line.

FIG. 2 shows a circuit diagram of such a switching element 16a,b.

The switching element 16a,b has both electronic switches 26, for example transistors, and isolating switches 28. Both of the switches 26, 28 have power-electronic differences. Due to their high power density and switching times in the range from a few nanoseconds, electronic switches 26 are preferably designed for switching electrical power. Their isolating action is, however, inadequate with regard to electrical isolation. For this reason, the switching elements 16a,b additionally have isolating switches 28.

In the exemplary embodiment, the precharging voltage is fed into the switching element 16a,b via the charging line 21a. The charging line 21a is preferably connected in the switching element 16a,b between the electronic switch 26 and the isolating switch 28. This arrangement of the charging line 21a permits precharging of the network sections 8 while the network sections 8 are still disconnected from the infeed unit 6 by the isolating switch 28. After precharging and thus equalization of the voltage levels of the network sections 8 with the voltage level of the infeed voltage, the network sections 8 are interconnected with the infeed unit 6 by the isolating switch 28. The charging line 21a furthermore has a decoupling diode 29 for decoupling the individual network sections 8 from one another.

Figure 3:
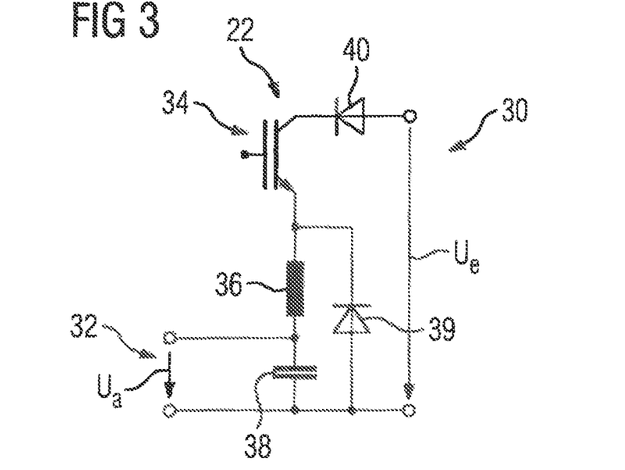
FIG. 3 an open-loop controllable voltage supply.

FIG. 3 shows a circuit diagram of a voltage reduction unit 22.

The voltage reduction unit 22 has an input side 30 for an input voltage $U_e$ (in the exemplary embodiment the infeed voltage of the infeed unit 6) and an output side 32 for an output voltage $U_a$ (in the exemplary embodiment the precharging voltage).

The voltage reduction unit 22 furthermore has a switch 34, preferably a semiconductor switch and in particular a transistor and a coil 36 and a capacitor 38.

The voltage reduction unit 22 functions as follows: when the switch 34 is closed, the input voltage $U_e$ applied to the input side 3 supplies a load applied to the output side 32 with the output voltage $U_a$. In the exemplary embodiment, the network sections 8 connected to the voltage reduction unit 22 correspond to the load. The switch 34 is alternately closed and opened by an open-loop control which is not shown or explained in greater detail in the exemplary embodiment. While the switch 34 is open, the two energy stores coil 36 and capacitor 38 supply the load via a directional diode 39. The output voltage $U_a$ applied to the output side 32 is thus adjusted and/or adjustable as a function of a duty factor $\alpha$. The duty factor defines a ratio between a pulse duration and a period duration. In other words, in the exemplary embodiment, the duty factor $\alpha$ indicates the proportion of a period duration for which the switch 34 is closed. The duty factor $\alpha$ thus has values in the range from 0 to 1 or, in relative terms, in the range between 0% and 100%. When, for example, the duty factor α has a value of 0.5, the switch 34 is closed for half the time of the period duration.

In other words, the output voltage $U_a$ applied to the output side 32 varies between 0 V (corresponds to a duty factor of 0; i.e. the switch 34 has an open position over the period duration) and the value of the input voltage (corresponds to a duty factor of 1; i.e, the switch 34 has a closed position over the period duration).

According to the first variant configuration, the network sections 8 are precharged with a precharging voltage. In circuit engineering terms, precharging is achieved by the voltage reduction unit 22 having a varying duty factor α, in particular which increases in value, during operation such that at the beginning of precharging an output voltage, which corresponds to the precharging voltage, with a value of 0 V is applied to the output side and is increased during precharging by an increasing duty factor α to the value of the input voltage of the voltage reduction unit 22, which corresponds to the infeed voltage.

In order to protect the voltage reduction unit 22, in particular the switch 34, in a voltage fault scenario, the voltage reduction unit 22 has a protection diode 40.

Figure 4:
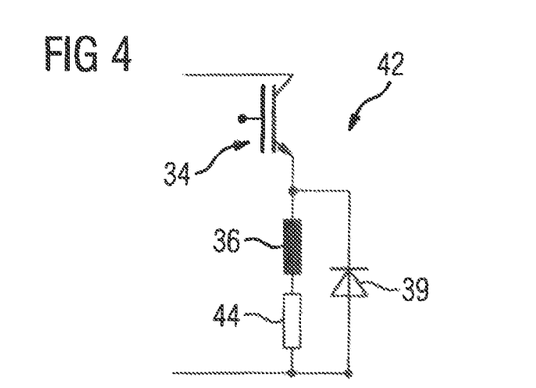
FIG. 4 an open-loop controllable discharging chopper.

FIG. 4 shows a circuit diagram of a discharge chopper 42 according to a second variant configuration.

Similarly to the first variant of precharging the network sections 8, according to the second variant the differing voltages of the network sections 8 are equalized by discharge of the network sections 8 disconnected from the infeed unit 6.

Discharge of the network sections 8 is carried out via the discharging chopper 42 shown in FIG. 3b. The discharging chopper 42 likewise has a switch 34, preferably a semiconductor switch and in particular a transistor together with a coil 36 and a resistor 44, preferably an ohmic resistor.

The discharge chopper 42 functions as follows: after disconnection of the network sections 8 from the infeed unit 6, said network sections have differing voltages and thus differing amounts of stored energy. The switch 34 of the discharge chopper 42 is closed for discharging of the network sections. The flowing charge-reversal currents which "transfer" the power from the energy stores into the resistor 44 are limited by the open-loop controllability of the switch 34 such that the charge-reversal currents drain away in controlled manner. After the switch 34 has been opened, the charge-reversal current still in the discharging chopper 42 flows again via a directional diode 39 through the resistor 44 and releases energy there, typically hi the form of heat.

Figure 5:
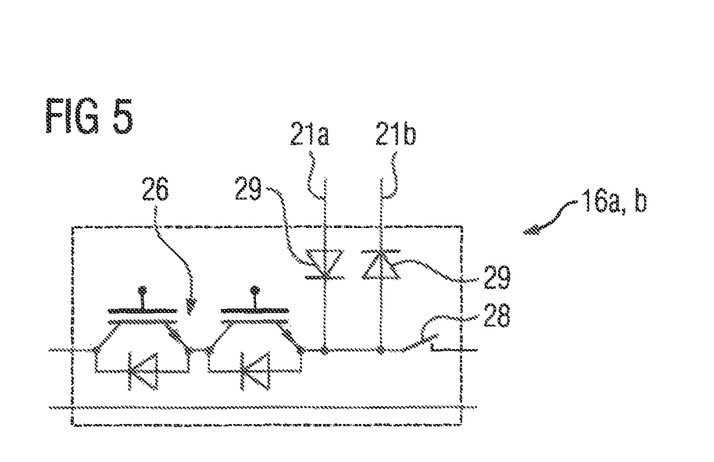
FIG. 5 a switching element with connected charging and discharging line.

FIG. 5 shows a circuit diagram of a switching element 16a,b with a connected charging line 21a and a discharging line 21b. The discharging line 21b should be considered to function similarly to the charging line 21a. The network sections 8 are connected via the discharging line 21b to the discharging chopper 42 such that the latter takes the form of a central discharging unit for discharging all the network sections 8 of the DC network 2.

In the exemplary embodiment according to FIG. 5, the switching element 16a,b has an electronic switch 26 and an isolating switch 28. Similarly to the switching element 16a,b from FIG. 2, the charging line 21a and the discharging line 21b are connected between the electronic switch 28 and the isolating switch 28. According to the invention, this connection permits either precharging or discharging of the network sections 8 with the infeed unit 6 disconnected. Both the charging line 21a and the discharging line 21b have decoupling diodes 29 which are conductive in opposing directions. Similarly to the switching element from FIG. 2, the decoupling diodes 29 are arranged for decoupling the individual network sections 8 from one another.

The charging line 21a and the discharging line 21b are expediently arranged together in a cable. In the case of a combined configuration of precharging and discharging of the network sections 8, after the network sections 8 have been discharged, the network sections 8 are for example precharged before they are again interconnected with the infeed unit 6.

What is claimed is:

1. A method for operating a direct-current network, the direct-current network comprising a plurality of network sections and an infeed unit, wherein the infeed unit is connected to the direct-current network via an infeed line and each network section is separably connected to the direct-current network via a dedicated switching element, the method comprising:

limiting with a controllable current limiter unit, which is connected to the network sections via a common additional distribution line, charge-reversal currents which flow between the network sections or between the infeed unit and the network sections due to differing voltage levels, after disconnecting the network sections from the infeed unit and prior to connecting the network sections with the infeed unit, wherein the controllable current limiter unit limits the charge-reversal currents via the common additional distribution line, and limiting, after the infeed unit is disconnected from the network sections, the charge-reversal currents by controllably discharging the network sections via a discharging unit by way of a discharging line connected to the distribution line.

2. The method of claim 1, wherein the current limiter unit is constructed as a controllable voltage supply and the distribution line comprises a charging line, the method further comprising:

precharging, via the charging line, network section having differing voltage levels following disconnection and prior to connection of the infeed unit with a precharging voltage, thereby equalizing the differing voltage levels and limiting the charge-reversal currents.

3. The method of claim 2, wherein the precharging voltage increases during precharging.

4. The method of claim 2, wherein the controllable voltage supply is constructed as a DC-DC converter.

5. The method of claim 4, wherein the controllable voltage supply is powered by the infeed unit.

6. The method of claim 2, wherein the precharging voltage increases after precharging so as to be equal to an infeed voltage of the infeed unit.

7. The method of claim 2, wherein for precharging the network sections, the precharging voltage is supplied to the network sections via a respective switching elements of a network section.

8. The method of claim 2, wherein the discharging unit is constructed as a controllable discharging regulator, the method further comprising equalizing the voltages of the network sections, after disconnection of the network sections from the infeed unit, by limiting the charge-reversal currents via the discharging regulator.

9. The method of claim 1, wherein the current limiter unit is controlled by remote control.

10. A direct-current network comprising:
a plurality of network sections,
an infeed unit having an infeed line, switching elements separably connecting the network sections to the infeed unit, each switching element having an electronic switch and an isolating switch, and a controllable current limiter unit connected to the network sections via a distribution line which includes a discharging line and a charging line, the current limiter unit further comprising a discharging unit for current-limited discharging of network sections via the discharging line after disconnection from the infeed unit, and a controllable voltage supply for precharging the networks sections via the charging line during operation, wherein the current limiter unit is configured during operation to limit charge-reversal currents which arise due to a voltage difference between the network sections or between the infeed unit and the network sections, and wherein the charging line and the discharging line are connected between the electronic switch and the isolating switch.

11. The direct-current network of claim 10, wherein the distribution line is connected in parallel with the infeed line.

12. The direct-current network of claim 10, wherein the controllable voltage supply is constructed as a buck converter.

13. The direct-current network of claim 10, wherein the discharging unit is constructed as a controllable discharging regulator.

14. The direct-current network of claim 10, wherein a plurality of current limiter units having a cascaded structure are connected to the network sections, with each current limiter unit being connected to several network sections.

15. The direct-current network of claim 10, wherein the charging line and/or the discharging line comprise a decoupling diode.

16. The method of claim 4, wherein the DC-DC converter is a buck converter.

* * * * *